United States Patent
Ward et al.

(10) Patent No.: US 11,444,794 B2
(45) Date of Patent: Sep. 13, 2022

(54) INTERNET OF THINGS DEVICE CONNECTIVITY REAL TIME NOTIFICATION

(71) Applicant: Verizon Patent and Licensing Inc., Basking Ridge, NJ (US)

(72) Inventors: Rachel Ward, Basking Ridge, NJ (US); Ning Zhang, Warren, NJ (US); Carl Wang, Syosset, NY (US); Brian Matthew White, Port Murray, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/839,791

(22) Filed: Apr. 3, 2020

(65) Prior Publication Data
US 2021/0314183 A1  Oct. 7, 2021

(51) Int. Cl.
| | | |
|---|---|---|
| *H04L 12/18* | (2006.01) | |
| *H04L 67/12* | (2022.01) | |
| *H04W 68/02* | (2009.01) | |
| *H04L 65/1073* | (2022.01) | |
| *H04L 65/1104* | (2022.01) | |
| *H04L 67/51* | (2022.01) | |

(52) U.S. Cl.
CPC ...... *H04L 12/1818* (2013.01); *H04L 65/1073* (2013.01); *H04L 65/1104* (2022.05); *H04L 67/12* (2013.01); *H04L 67/51* (2022.05); *H04W 68/02* (2013.01)

(58) Field of Classification Search
CPC ............. H04L 12/1818; H04L 65/1006; H04L 65/1073; H04L 65/1063; H04L 65/40; H04L 67/12; H04L 67/16; H04W 68/02; H04W 4/60; H04W 84/18; H04W 8/18
See application file for complete search history.

(56) References Cited

U.S. PATENT DOCUMENTS

| | | | | |
|---|---|---|---|---|
| 2016/0174148 A1* | 6/2016 | Seed | ................. | H04W 40/005 |
| | | | | 370/311 |
| 2018/0049156 A1* | 2/2018 | Laha | ................. | H04W 76/40 |
| 2018/0063860 A1* | 3/2018 | Yeung | ................ | H04W 4/70 |
| 2018/0109936 A1* | 4/2018 | Ting | ................... | H04W 4/30 |

(Continued)

OTHER PUBLICATIONS

Roger B Marks, "IEEE Standard for WirelessMAN-Advanced Air Interface for Broadband Wireless Access Systems: Amendment 1: Enhancements to Support Machine-to-Machine Applications" IEEE, Standard 802.16.1B-2012 pp. 32, 41, 53 (Year: 2012).*

*Primary Examiner* — Mohamed A. Wasel
*Assistant Examiner* — Rachel J Hackenberg

(57) ABSTRACT

A device may include a memory storing instructions and processor configured to execute the instructions to maintain an Internet of Things (IoT) device database that stores, for an IoT device in the IoT device database, an application server device list that includes one or more application server devices that are to be notified when the IoT device is determined to be in an awake state. The processor may be further configured to receive a first indication from a first application server device that the IoT device is in an awake state; access the IoT device database to identify a second application server device associated with the IoT device; and send a second indication to the second application server device that the IoT device is in the awake state based on the received first indication from the first application server device.

20 Claims, 9 Drawing Sheets

(56) References Cited

U.S. PATENT DOCUMENTS

| | | | | |
|---|---|---|---|---|
| 2018/0375902 A1* | 12/2018 | Wong | ................ | H04W 52/0274 |
| 2019/0020718 A1* | 1/2019 | Mathews | .............. | H04L 67/125 |
| 2019/0058711 A1* | 2/2019 | Zhu | ........................ | H04W 4/70 |
| 2020/0275350 A1* | 8/2020 | Kodaypak | ............. | H04W 48/14 |
| 2020/0366577 A1* | 11/2020 | Sapra | ...................... | H04L 67/16 |
| 2021/0184931 A1* | 6/2021 | Yao | .................... | H04L 41/0806 |

\* cited by examiner

INTERNET OF THINGS DEVICE CONNECTIVITY REAL TIME NOTIFICATION

BACKGROUND INFORMATION

To satisfy the needs and demands of users of mobile communication devices, providers of wireless communication services continue to improve and expand available services as well as networks used to deliver such services. One aspect of such improvements includes the development of wireless access networks as well as options to utilize such wireless access networks. A wireless access network may manage a large number of devices using different types of services and experiencing various types of different conditions. Managing a large number of devices may pose various challenges.

DETAILED DESCRIPTION OF PREFERRED EMBODIMENTS

Figure 1:
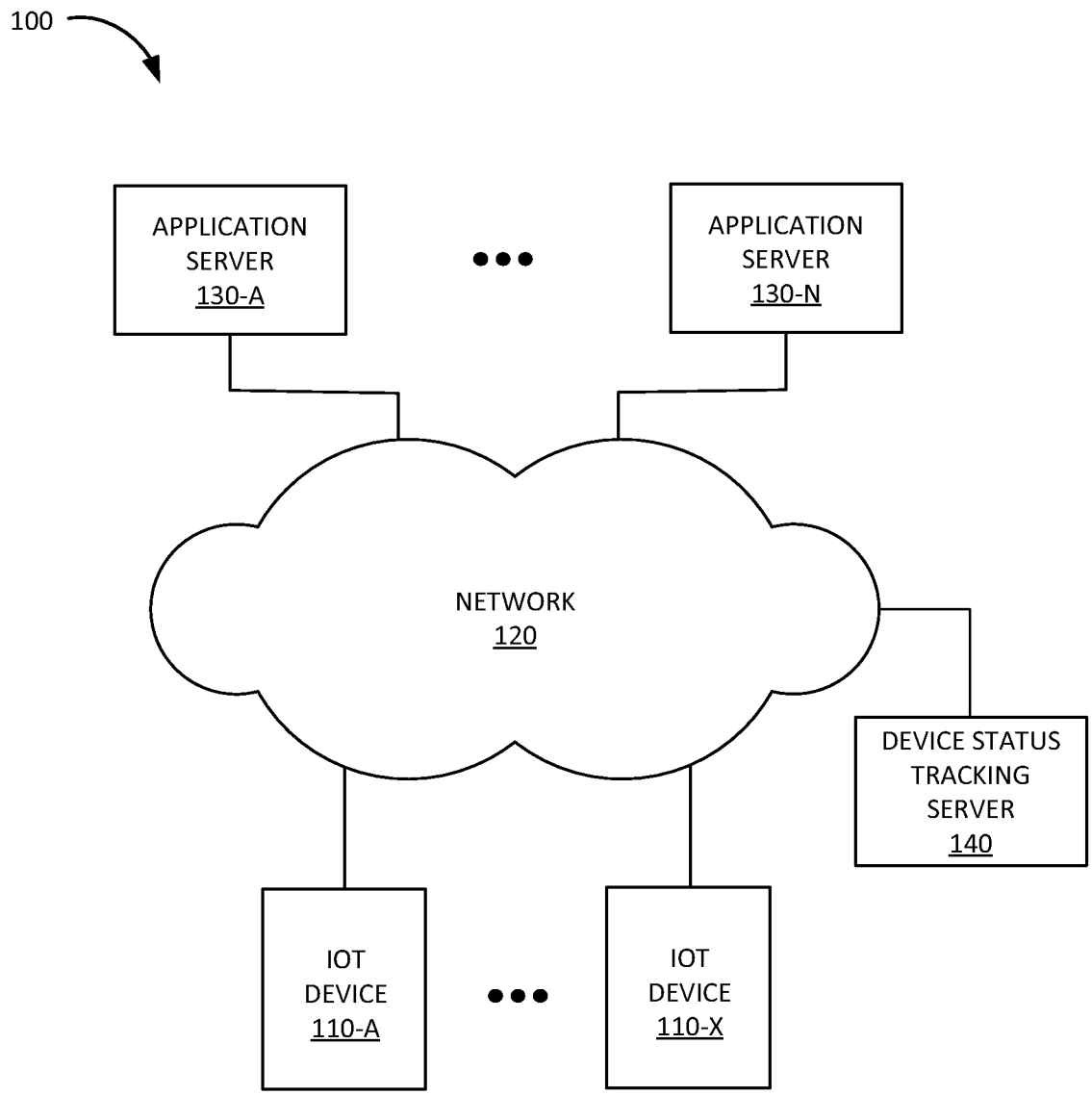
FIG. 1 illustrates an environment according to an implementation described herein.

The following detailed description refers to the accompanying drawings. The same reference numbers in different drawings identify the same or similar elements.

While wireless access networks are traditionally designed to support mobile devices such as smart phones, an increasing number of Internet of Things (IoT) applications have led to a growing number of IoT devices employing machine-to-machine (M2M) communication, such as Machine-Type Communication (MTC) over these wireless access networks. An IoT device may be configured to communicate with other devices without requiring explicit user interaction. IoT devices may have a wide variety of uses, ranging from stationary uses such as utility meters, environmental sensors, parking meters and/or occupancy sensors, security sensors, smart lighting, traffic cameras, advertising displays, point-of-sale terminals, vending machines, remote diagnostics devices, power grid sensors and/or management devices, to high velocity autonomous vehicles and aerial drones.

Uses of IoT devices are increasing exponentially and may result in a large number of such devices being serviced by a wireless access network. Estimates indicate that the number of IoT devices within a wireless operator's network may increase to hundreds of millions of devices communicating with each other autonomously with little to no human intervention. Thus, a provider of wireless communication services may manage wireless access networks that include a large number of IoT devices.

Advancement in IoT technology, combined with availability of low cost and low power wireless access coverage infrastructure, such as the use of Narrow Band (NB) IoT (NB-IoT) technology and/or Long Term Evolution (LTE) Category M1 (CAT-M) technology, enables adoption of IoT devices that are designed to operate on a battery over an extended period of time (e.g., up to several months or even years). For example, an IoT device may collect data from one or more sensor devices and send the collected data to an application server device over a wireless connection. The IoT device may be enabled with functionality to conserve battery life, such as, for example, an LTE CAT-M power saving mode (PSM).

When the IoT device enters a sleep state, such as the PSM, the IoT device does not listen to communication requests from other devices and may thus be unreachable via a network connection. Furthermore, IoT devices are frequently deployed in a location that is difficult or inconvenient to access physically. Therefore, IoT devices are often implemented with Firmware-Over-The-Air (FOTA) capability for firmware updates. An IoT device with FOTA capability may receive a FOTA update from a FOTA server when a FOTA update becomes available over a secure wireless connection. A FOTA update may, for example, ensure that the IoT device is compliant with the most recent security and/or functionality requirements.

However, the IoT device may only connect to the FOTA server, and/or another type of application server, after the IoT device exits a sleep or low power mode and contacts the application server. For example, an asset tracking IoT device may report its location once a week at a particular time to an asset tracking application server. At the scheduled time, the IoT device connects to the asset tracking application server, reports its location, and, after determining that the reporting event was successful, may tear down the radio connection link and go back to a sleep mode until the next reporting time. The IoT device may not have a pre-set schedule for contacting the FOTA server and may also lack user interface functionality to notify the IoT device of the availability of a required update. Thus, it may not be possible for the IoT device to generate a pull request for the update. If other application servers need to communicate with the IoT device and are not on the IoT device scheduled contact list, these application servers are not able to communicate with the IoT device unless they contact the IoT device during the brief waking period. However, these application servers may not be able to determine when the IoT device is awake and thus may not be able to communicate with the IoT device entirely.

A server device may leverage Home Subscriber Server (HSS) registration status to determine whether the IoT device is connected to the network. The server may connect to the HSS and use the registration status of the IoT device to determine whether the IoT device is connected to the network and, therefore, in an awake state. However, many IoT devices, such as IoT devices connected using NB-IoT, may only use the control plane for sending or receiving data. For example, the IoT device may use a Radio Resource Control (RRC) re-establishment feature to hide a temporary loss of radio interference to the upper layers of the communication stack. Thus, the HSS registration status may not reflect the real device connectivity status, because the HSS registration status may only reflect the status of data plane connections.

A server device may also leverage Service Capability Exposure Function (SCEF). An SCEF may be used to interface a provider network with an application server and enable the application server to monitor the status of an IoT device and/or communicate with the IoT device using non-Internet Protocol (IP) data delivery. The server device may subscribe to the SCEF to receive information relating to the connectivity status of the IoT device. The server device may then receive a notification when the IoT device connects to a Mobility Management Entity (MME) device in the provider network. However, the SCEF may be managed by a particular provider of wireless services and if the IoT device does not connect to the provider's network, the SCEF is not able to detect the connectivity status of the IoT device. Therefore, relying on the HSS or the SCEF may not be reliable for detecting when the IoT device is in an awake state.

Implementations described herein relate to IoT device connectivity real time notification. A device status tracking server device may be configured to detect if an IoT device is in an awake state without requiring the IoT device to be connected to a network using a particular access method or connection type. For example, the IoT device may establish a connection using a Fourth Generation (4G) Long Term Evolution (LTE) wireless network, a Fifth Generation (5G) New Radio (NR) wireless network, a WiFi Access Point (AP), a Bluetooth connection, an NB-IoT connection, a CAT-M connection, an IP version 6 (IPv6) over Low Power Wireless Personal Area Network (6LoWPAN) connection, and/or another type of wireless or wired connection.

The device status tracking server may maintain an IoT device database (DB) that stores, for each IoT device in the IoT DB, a current device status and an application server list that identifies application server devices that are to be notified when the IoT device is determined to be in an awake state. The device status tracking server may register an application server by establishing a communication channel with the application server and receive a registration request, for an IoT device, which indicates that the application server is to be notified when the IoT device enters an awake state. The device status tracking server may update the application server list for the IoT device, so that the list includes the identity of the application server from which the registration request was received. The device status tracking server may further instruct the application server to send a message to the device status tracking server when the application server receives a message from the IoT device or otherwise detects that the IoT device has entered an awake state. The device status tracking server may then monitor the established communication with the application server for notifications relating to the IoT device.

In some implementations, when the device status tracking server receives, from an application server, a notification indicating that an IoT device is in an awake state, the device status tracking server may instruct the application server to instruct the IoT device to remain in the awake mode. The instruction to the IoT device to remain in the awake mode may instruct the IoT device to remain awake for a particular time period, until receiving a message from a particular application server, and/or based on another criterion. The device status tracking server may then notify all the other registered application servers for the IoT that the IoT device is awake. The notified application servers may include, for example, a FOTA server associated with the IoT device. For example, the device status tracking server may receive a first indication from a first application server device that the IoT device is in an awake state, access the IoT device DB to identify a second application server device associated with the IoT device, and send a second indication to the second application server device that the IoT device is in the awake state.

In some implementations, the device status tracking server may further answer messages from application servers inquiring whether an IoT device is in an awake state. If an application server inquires whether the IoT device is in an awake state, the device status tracking server may respond with an indication whether, based on the most recently obtained information, the IoT device is in a sleep state or in an awake state.

Furthermore, in some implementations, the device status tracking server may receive a registration request from an analytics application server for updates relating to a group of IoT devices. The device status tracking server may update the IoT device DB based on the received registration request, and send aggregated device status information relating to the group of IoT devices to the analytics application server.

FIG. 1 is a diagram of an exemplary environment 100 in which the systems and/or methods, described herein, may be implemented. As shown in FIG. 1, environment 100 may include IoT devices 110-A to 110-X (referred to herein individually as "IoT device 110" and collectively as "IoT devices 110"), a network 120, application servers 130-A to 130-N (referred to herein individually as "application server 130" and collectively as "application servers 130"), and a device status tracking server (DSTS) 140.

IoT device 110 may include any IoT device with wired or wireless communication functionality. For example, IoT device 110 may be configured to communicate using a machine to machine (M2M) communication, such as Machine Type Communication (MTC). IoT device 110 may be configured to use and establish one or more of a 4G LTE connection, a 5G NR connection, a WiFi connection, a Bluetooth t connection, a Zigbee connection, a 6LoWPAN connection, an NB-IoT connection, a CAT-M connection, and/or using another type of connection. IoT device 110 may include a utility meter (e.g., electricity meter, water meter, gas meter, etc.), an asset tracking device (e.g., a system monitoring the geographic location of a fleet of vehicles, etc.), a traffic management device (e.g., a traffic light, traffic camera, road sensor, road illumination light, etc.), an environmental sensor device (e.g., temperature sensor, humidity sensor, wind speed and/or direction sensor, etc.), a climate controlling device (e.g., a thermostat, a ventilation system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, a vending machine, a parking meter, etc.), health monitoring device (e.g., a blood pressure monitoring device, a blood glucose monitoring device, etc.), and/or another type of electronic device.

Network 120 may enable IoT devices 110, application servers 130, and/or device status tracking server 140 to communicate with each other. For example, network 120 may enable the establishment of an Internet Protocol (IP) connection between any of IoT devices 110, application servers 130, and/or device status tracking server 140. Network 120 may include a local area network (LAN), a wide area network (WAN), a metropolitan area network (MAN), an optical network, a cable television network, a satellite network, an ad hoc network, a telephone network (e.g., the Public Switched Telephone Network (PSTN) or a cellular network), an intranet, and/or a combination thereof.

Furthermore, network 120 may include a Radio Access Network (RAN) and a core network associated with the RAN. The RAN may enable IoT devices 110 to connect to network 120 via wireless signals for mobile telephone service, Short Message Service (SMS) message service, Multimedia Message Service (MMS) message service, Rich Communication Services (RCS) service, Internet access, Multi-Access Edge Computing (MEC) services, cloud computing, and/or other types of data services. RAN 120 may include base stations that each include a radio frequency (RF) transceiver facing a particular direction. The base stations may include a 4G base station configured to communicate with user devices 140 as an eNodeB that uses a 4G LTE air interface, a 5G base station configured to communicate with IoT devices 110 as a gNodeB that uses a 5G New Radio (NR) air interface, and/or another type of base station.

The RAN may include features associated with an LTE Advanced (LTE-A) network and/or a 5G core network or other advanced network, such as management of 5G NR base stations; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as CAT-M), Low Power Wide Area (LPWA) technology such as NB-IoT technology, and/or other types of MTC technology; and/or other types of LTE-A and/or 5G functionality.

Network 120 may include one or more MEC networks. A MEC network may be in proximity to the one or more base stations from a geographic and network topology perspective. As an example, the MEC network may be located on a same site as one of the one or more base stations. As another example, the MEC network may be geographically closer to the one or more base stations, and reachable via fewer network hops and/or fewer switches, than other base stations. As yet another example, the MEC network may be reached without having to go through a gateway device, such as a 4G Packet Data Network Gateway (PGW) or a 5G User Plane Function (UPF). The MEC network may include one or more MEC devices that include particular hardware capabilities, such as particular Central Processing Units (CPUs), Graphics Processing Units (GPUs), hardware accelerators, and/or other types of hardware capabilities; particular software capabilities, such as a particular operating system, virtual machine, virtual container, application, and/or another type of software capability; and/or other functionality that enables the MEC devices to operate at low latency. In some implementations, device status tracking server 140 may be implemented in one or more MEC devices.

The core network associated with the RAN may include a 4G LTE core network (e.g., an evolved packet core (EPC) network), a 5G core network, and/or another type of core network. A 4G core network may include devices that implement network functions that include: an MME that implements control plane processing, authentication, mobility management, tracking and paging, and activating and deactivating bearers; a Serving Gateway (SGW) that provides an access point to and from UE devices, acts as a local anchor point during handovers, and directs gateway to a PGW; a PGW that functions as a gateway to a particular packet data network; a Policy and Charging Rules Function (PCRF) that implements policy and charging rules functions, such as establishment of Quality of Service (QoS) requirements, setting allowed bandwidth and/or data throughput limits for particular bearers, and/or other policies; and an HSS that stores subscription information for UE devices, including subscription profiles that include authentication and access authorization information, group device memberships, subscription privileges, and/or other types of subscription information.

A 5G core network may include devices that implement network functions that include an Access and Mobility Function (AMF) to perform registration management, connection management, reachability management, mobility management, and/or lawful intercepts; an SMF to perform session management, session modification, session release, IP allocation and management, Dynamic Host Configuration Protocol (DHCP) functions, and selection and control of a UPF; a UPF to serve as a gateway to other packet data networks, act as an anchor point, perform packet inspection, routing, and forwarding, perform QoS handling in the user plane, uplink traffic verification, transport level packet marking, downlink packet buffering, and/or other type of user plane functions; an Application Function (AF) to provide services associated with a particular application; a Unified Data Management (UDM) to manage subscription information, handle user identification and authentication, and perform access authorization; a Policy Control Function (PCF) to support policies to control network behavior, provide policy rules to control plane functions, access subscription information relevant to policy decisions, and perform policy decisions; a Charging Function (CHF) to perform charging and billing functions; a Network Repository Function (NRF) to support service discovery, registration of network function instances, and maintain profiles of available network function instances; a Network Exposure Function (NEF) to expose capabilities and events to other network functions, including third party network functions; a Network Slice Selection Function (NSSF) to select a network slice instance to serve a particular IoT device 110; and/or other types of network functions. Furthermore, a 5G core network may implement network slicing. Network slicing is a form of virtual network architecture that enables multiple logical networks to be implemented on top of a common shared physical infrastructure using software defined networking (SDN) and/or network function virtualization (NFV). Each logical network, referred to as a "network slice," may encompass an end-to-end virtual network with dedicated storage and/or computation resources, may be configured to implement a different set of requirements and/or priorities, and/or may be associated with a particular QoS class, type of service, and/or particular enterprise customer associated with a set of UE devices.

Application server 130 may include one or more computer devices, such as, for example, server devices, configured to communicate with one or more IoT devices 110. For example, application server 130 may be configured to receive data from IoT device 110 (e.g., sensor data, location data, device status data, etc.), to remotely control IoT device 110 (e.g., to move an actuator, control a display device, control a microcontroller, etc.), to send application and/or other types of software updates to IoT device 110, and/or otherwise communicate with IoT device 110. Multiple application servers 130 may be associated with a particular IoT device 110. For example, an IoT device 110 may be associated with a first application server 130 that receives sensor data from IoT device 110, a second application server 130 that sends configuration updates to a sensor associated with IoT device, a third application server 130 that provides FOTA updates to IoT device 110, etc.

DSTS 140 may include one or more computer devices, such as, for example, server devices, configured to perform device status tracking, notification, and/or reporting for IoT devices 110. DSTS 140 may maintain an IoT device DB that stores, for each IoT device 110 in the IoT DB, a current device status and an application server list that identifies application server devices that are to be notified when IoT device 110 is determined to be in an awake state. DSTS 140 may register application servers 130 for a device status service for a particular IoT device 110, may receive an indication from a particular application server 130 that the particular IoT device 110 is in an awake state, and may inform all other application servers 130 associated with the particular IoT device 110 that the particular IoT device 110 is in the awake state.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
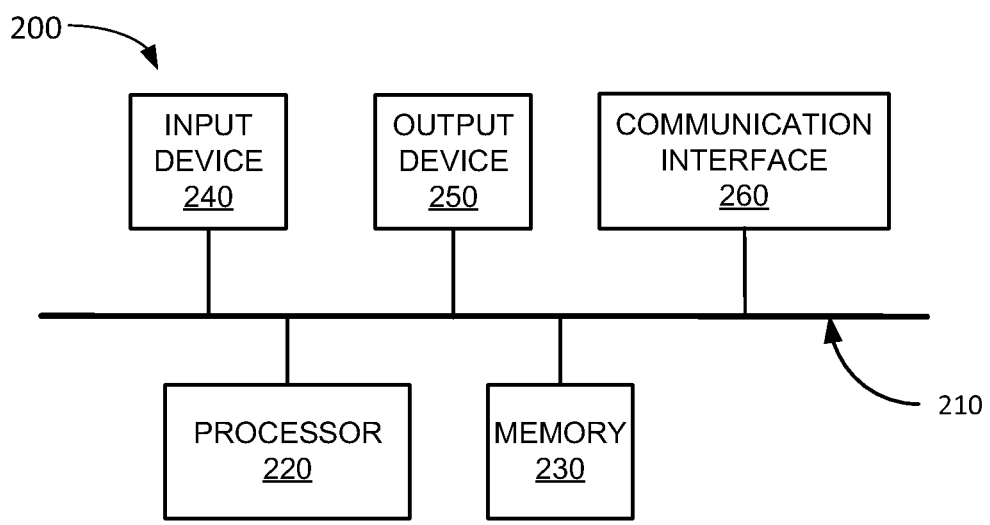
FIG. 2 illustrates exemplary components of a device that may be included in the environment of FIG. 1 according to an implementation described herein.

FIG. 2 is a diagram illustrating example components of a device 200 according to an implementation described herein. IoT device 110, application server 10, and/or device status tracking server 140 may each include, or be implemented on, one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, central processing unit (CPU), graphics processing unit (GPU), tensor processing unit (TPU), hardware accelerator, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to RF signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to IoT device status tracking, notification, and/or reporting. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally, or alternatively, one or more components of device 200 may perform one or more tasks described as being performed by one or more other components of device 200.

Figure 3:
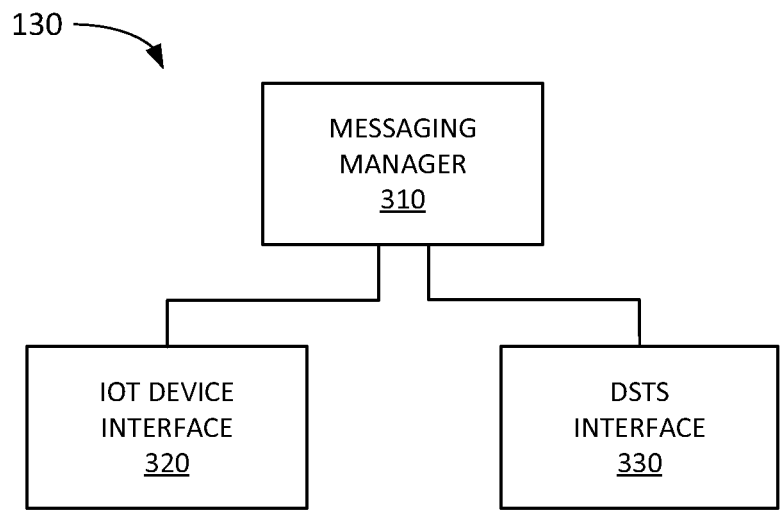
FIG. 3 illustrates exemplary components of the application server of FIG. 1 according to an implementation described herein.

FIG. 3 is a diagram illustrating exemplary components of application server 130. The components of application server 130 may be implemented, for example, via processor 220 executing instructions from memory 230. Alternatively, some or all of the components of application server 130 may be implemented via hard-wired circuitry. As shown in FIG. 3, application server 130 may include a messaging manager 310, an IoT device interface 320, and a DSTS interface 330.

Messaging manager 310 may manage messages to be sent to IoT devices 110 or messages received from IoT devices 110. IoT device interface 320 may be configured to communicate with IoT device 110. For example, IoT device interface 320 may provide one or more Application Programming Interfaces (APIs) to IoT device 110 that IoT device 110 may use to send messages to application server 130. DSTS interface 330 may be configured to communicate with DSTS 140. For example, DSTS interface 140 may use an API provided by DSTS 140 to report that IoT device 110 is awake and/or to receive an indication that IoT device 110 is awake.

Messaging manager 310 may receive a message from IoT device 110, such as a message reporting sensor data, a message acknowledging successful receipt of instructions, etc. In response, messaging manager 310 may send a message to DSTS 140, using DSTS interface 330, indicating that, based on the message received from IoT device 110, IoT device 110 is in an awake state. Furthermore, messaging manager 310 may determine that a message is to be sent to IoT device 110 and may determine whether IoT device 110 is in an awake state. For example, messaging manager 310 may send a request to DSTS 140, via DSTS interface 330, inquiring whether IoT device 110 is in an awake state. If DSTS 140 indicates that IoT device 110 is not awake, messaging manager 310 may hold the message to IoT device 110 until receiving an indication from DSTS 140 that IoT device 110 has entered an awake state.

Although FIG. 3 shows exemplary components of application server 130, in other implementations, application server 130 may include fewer components, different components, differently arranged components, or additional components than depicted in FIG. 3. Additionally, or alternatively, one or more components of application server 130 may perform functions described as being performed by one or more other components of application server 130.

Figure 4:
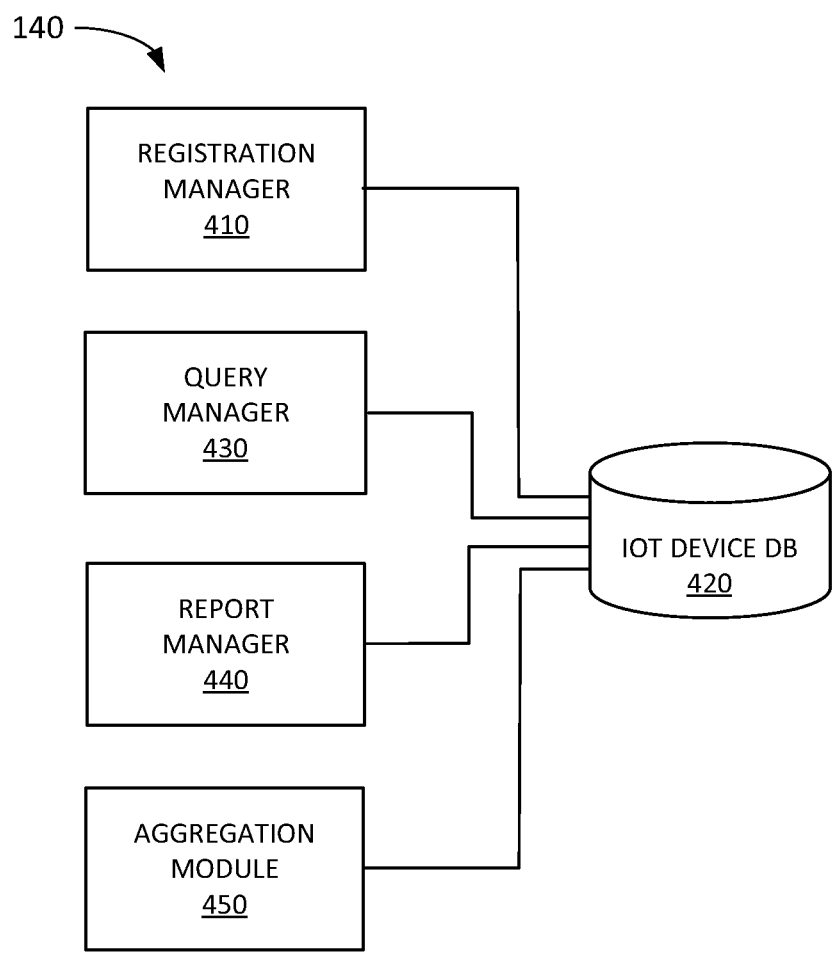
FIG. 4 illustrates exemplary components of the device status tracking server of FIG. 1 according to an implementation described herein.

FIG. 4 is a diagram illustrating exemplary components of DSTS 140. The components of DSTS 140 may be implemented, for example, via processor 220 executing instructions from memory 230. Alternatively, some or all of the components of DSTS 140 may be implemented via hard-wired circuitry. As shown in FIG. 4, DSTS 140 may include a registration manager 410, an IoT device DB 420, a query manager 430, a report manager 440, and an aggregation module 450.

Registration manager 410 may manager registration of application servers 130 for a device status service. For example, registration manager 410 may receive a request from application server 130 to receive notifications when a particular IoT device 110 is in an awake state. Registration manager 410 may update IoT device DB 420 based on such received registration requests from application servers 130. IoT device DB 420 may store information relating to IoT devices 110. Exemplary information that may be stored in IoT device DB 420 is described below with reference to FIG. 5. Furthermore, in some implementations, registration manager 410 may also be configured to receive device status information for IoT devices 110 from particular network components, such as an MME, HSS, SCEF, and/or other devices in a core network.

Query manager 430 may receive queries from application servers 130 inquiring about the device state of particular IoT devices 110. Query manager 430 may respond to a query with the most recent information, relating to a particular IoT device 110, stored in IoT device DB 420. For example, query manager 430 may respond to the requesting application server 130 with information indicating whether the particular IoT device 110 is awake or in a sleep or power saving mode.

Report manager 440 may generate a report indicating that a particular IoT device 110 has entered an awake state based on receiving a message from an application server 130. Report manager 440 may then instruct the application server 130 to keep the IoT device 110 awake and may send a report indicating that the IoT device 110 is awake to all other application servers 130 associated with the particular IoT device 110.

Aggregation module 450 may aggregate device status data relating to IoT devices 110. For example, aggregation module 450 may aggregate device status information relating to a group of IoT devices 110 and may send the aggregated device status information to an application server 130 (e.g., an analytics server).

Although FIG. 4 shows exemplary components of DSTS 140, in other implementations, DSTS 140 may include fewer components, different components, differently arranged components, or additional components than depicted in FIG. 4. Additionally, or alternatively, one or more components of DSTS 140 may perform functions described as being performed by one or more other components of DSTS 140.

Figure 5:
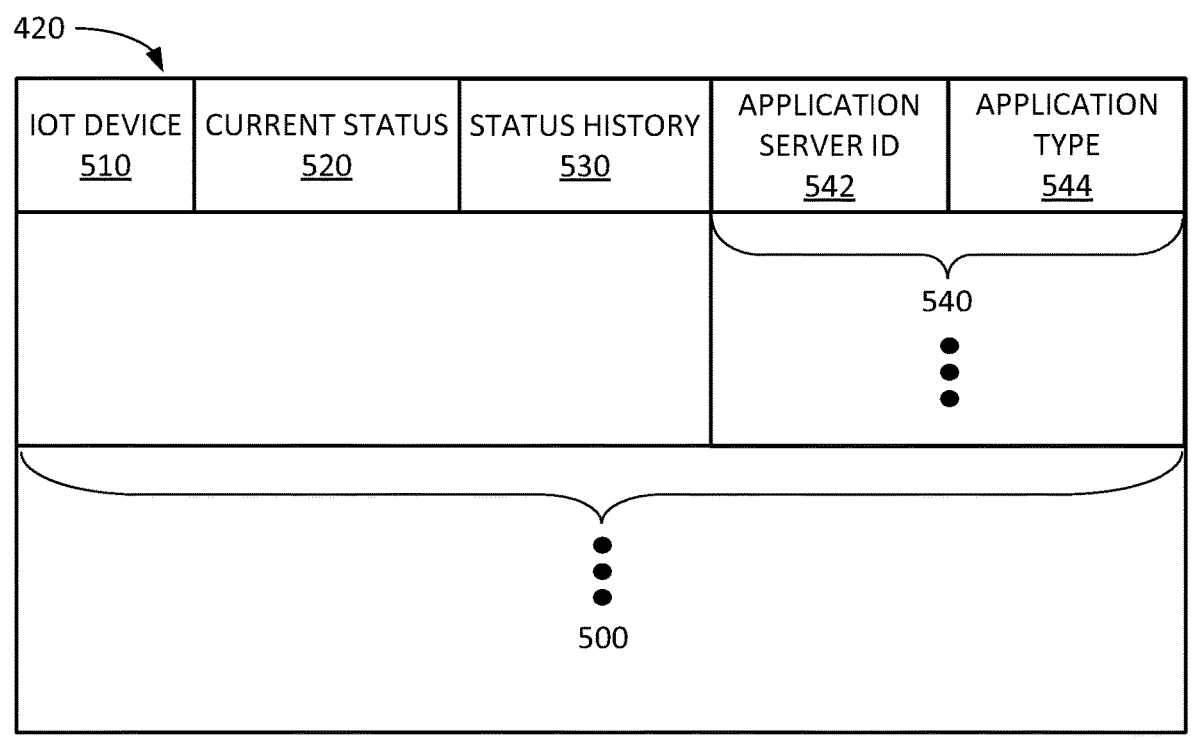
FIG. 5 illustrates exemplary components of the Internet of Things (IoT) device database of FIG. 4 according to an implementation described herein.

FIG. 5 is a diagram illustrating exemplary information stored in IoT device DB 420 according to an implementation described herein. As shown in FIG. 5, IoT device DB 420 may include one or more IoT device records 500. Each IoT device record 500 may store information relating to a particular IoT device 110. Each IoT device record 500 may include an IoT device field 510, a current status field 520, a status history field 530, and application server fields 540.

IoT device field 510 may store information relating to a particular IoT device 110. For example, IoT device field 510 may store an identifier such as, for example, an International Mobile Equipment Identity (IMEI), a Mobile Directory Number (MDN), an International Mobile Subscriber Identity (IMSI), a Mobile Station International Subscriber Directory Number (MSISDN), a Globally Unique Temporary Identity (GUTI), a Cell Radio Network Temporary Identity (CRTNI), an IP address, a Media Access Control (MAC) address, and/or another type of identifier associated with the particular IoT device 110.

Current status field 520 may store information identifying a current status associated with the particular IoT device 110 and a timestamp indicating when the current status has been identified. For example, current status field 520 may store information indicating whether the particular IoT device 110 is in an awake mode or in a sleep or power saving mode. When DSTS 140 receives an indication from application server 130 that the particular IoT device 110 is awake, DSTS 140 may change the information stored in current status field 520 to indicate the particular IoT device 110 is awake. In some implementations, DSTS 140 may change the status information, for the particular IoT device 110, stored in current status field 520 to indicate an awake state for a particular length of time. The particular length of time may be based on a predetermined default value, based on historical device status information for the particular IoT device 110, and/or based on other types of information. In other implementations, DSTS 140 may change the status of the particular IoT device 110 stored in current status field 520 from awake back to sleep based on receiving an indication from application server 130 that the particular IoT device 110 has returned to a sleep mode or power saving mode.

Status history field 530 may store information relating to the device status history associated with the particular IoT device 110. For example, the device status history may indicate time periods during which the particular IoT device 110 has been in an awake state.

Each of application server fields 540 may store information relating to a particular application server 130. Application server field 540 may include an application server identifier (ID) field 542 and an application type field 544. Application server ID field 542 may store an ID associated with the particular application server 130. For example, application server ID field 542 may store a name associated with the particular application server 130, an IP address associated with the particular application server 130, a network name and/or address associated with the application server 130, and/or other types of IDs associated with the application server 130. Application type field 544 may store information identifying the type of application server associated with the application server 130, such as whether the particular application server 130 receives data from the particular IoT device 110, whether the particular application server 130 corresponds to a FOTA server, whether the particular application server 130 corresponds to another type of update server, whether the particular application server 130 corresponds to an analytics server, etc.

Although FIG. 5 shows exemplary components of IoT device DB 420, in other implementations, IoT device DB 420 may include fewer components, different components, additional components, or differently arranged components than depicted in FIG. 5.

Figure 6:
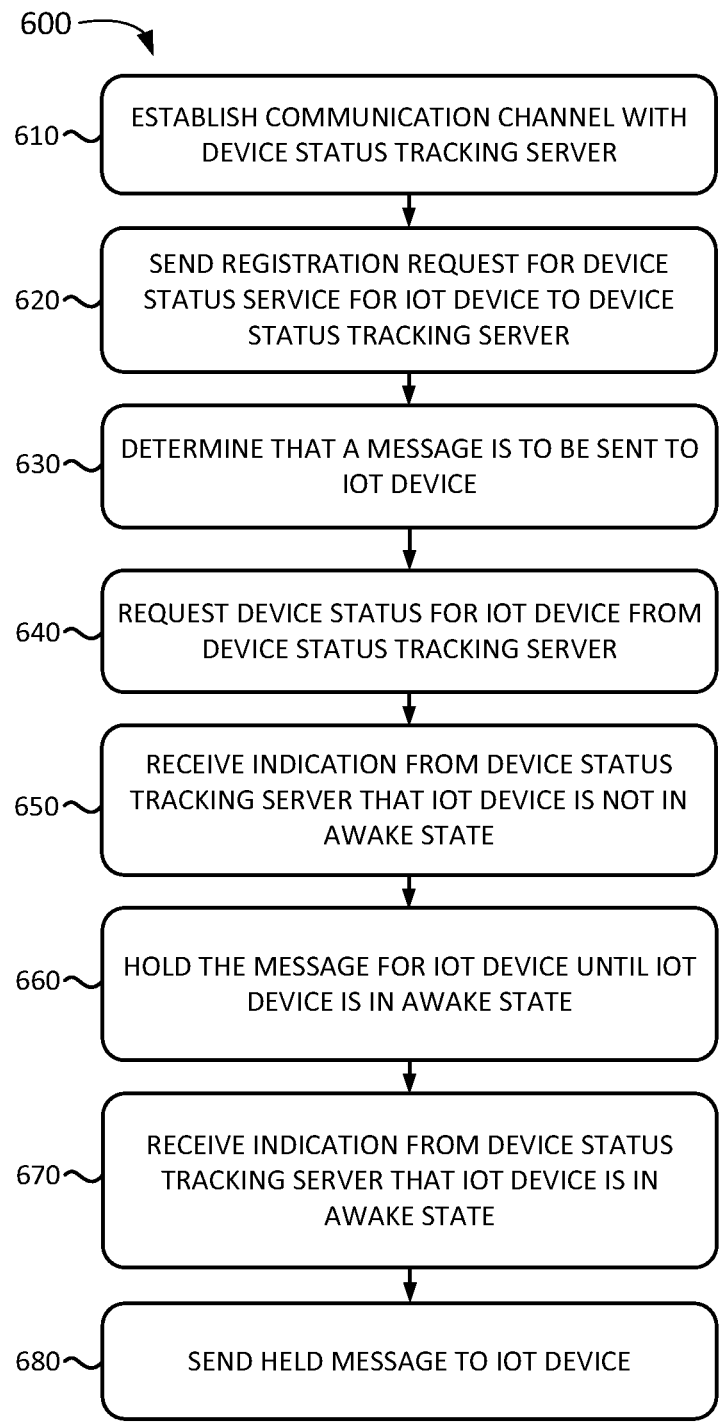
FIG. 6 illustrates a flowchart of an application server processing a message for an IoT device according to an implementation described herein.

FIG. 6 illustrates a flowchart of an application server processing a message for an IoT device according to an implementation described herein. In some implementations, process 600 of FIG. 6 may be performed by application server 130. In other implementations, some or all of process 600 may be performed by another device or a group of devices separate from application server 130.

As shown in FIG. 6, process 600 may include establishing a communication channel with the device status tracking server (block 610) and sending a registration request for device status service for an IoT device to the device status tracking server (block 620). For example, application server 130 may establish an IP connection with DSTS 140 and send a registration request to DSTS 140. The registration request includes information identifying IoT device 110. The registered application server 130 may thus be notified when DSTS 140 determines that IoT device 110 is in an awake state.

A determination may be made that a message is to be sent to the IoT device (block 630). The device status for the IoT device may be requested from the device status tracking server (block 640). An indication may be received from the device status tracking server that the IoT device is not in an awake state (block 650) In this embodiment, the message to the IoT device may be held until the IoT device is in an awake state (block 660). For example, application server 130 may determine that a message is to be sent to IoT device 110 and may send an inquiry to DSTS 140 as to whether IoT device 110 is in an awake state and connected to the network. If DSTS 140 responds with an indication that IoT device 110 is not in an awake state and/or not connected to the network, application server 130 may hold the message to IoT device 110 until IoT device 110 wakes up from a sleep state or power saving mode.

An indication may be received from the device status tracking server that the IoT device is in an awake state (block 670) and the held message may be sent to the IoT device (block 680). For example, if, at a later time, application server 130 receives an indication from DSTS 140 that the IoT device 110 is awake and/or connected to the network, application server 130 may send the held message to IoT device 110 while IoT device 110 is in the awake state.

Figure 7:
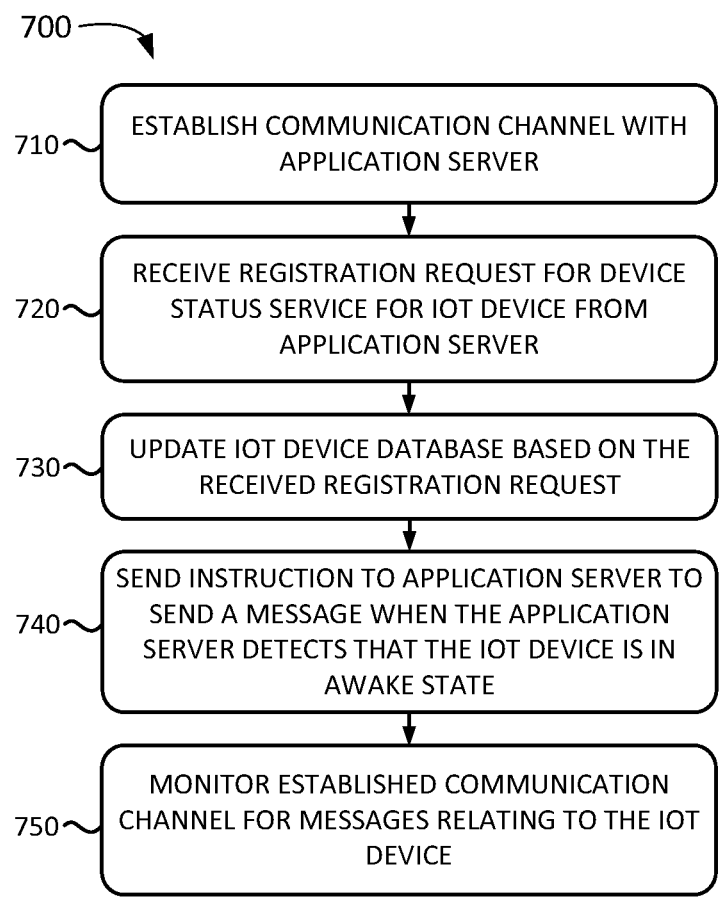
FIG. 7 illustrates a flowchart of a process for registering an application server for device status tracking according to an implementation described herein.

FIG. 7 illustrates a flowchart of a process for registering an application server for device status tracking according to an implementation described herein. In some implementations, process 700 of FIG. 7 may be performed by DSTS 140. In other implementations, some or all of process 700 may be performed by another device or a group of devices separate from DSTS 140.

As shown in FIG. 7, process 700 may include establishing a communication channel with an application server (block 710) and receiving a registration request for device status service for an IoT device from the application server (block 720). For example, application server 130 may establish an IP connection with DSTS 140 and send a registration request to DSTS 140 that includes information identifying IoT device 110 and a request to be notified when DSTS 140 determines that IoT device 110 is in an awake state.

An IoT device DB may be updated based on the received registration request (block 730), an instruction may be sent to the application server to send a message when the application server detects that the IoT device is in an awake state (block 740), and the established communication channel may be monitored for messages relating to the IoT device (block 750). For example, DSTS 140 may update IoT device record 500 for IoT device 110 to create a new application server field 540 for application server 130 from which the registration request is received. DSTS 140 may further instruct application server 130 to send a message to DSTS 140 if application server 130 detects that IoT device 110 has entered an awake state and/or is connected to the network and may monitor for messages from application server 130.

Figure 8:
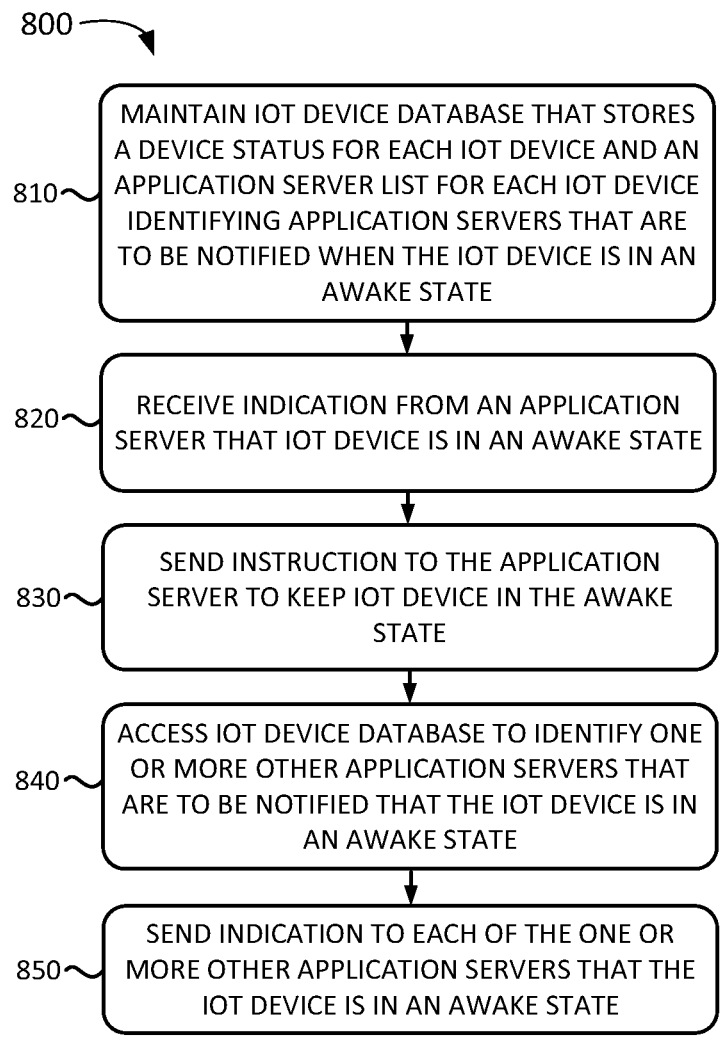
FIG. 8 illustrates a flowchart of a process for tracking device status according to an implementation described herein.

FIG. 8 illustrates a flowchart of a process for tracking device status according to an implementation described herein. In some implementations, process 800 of FIG. 8 may be performed by DSTS 140. In other implementations, some or all of process 800 may be performed by another device or a group of devices separate from DSTS 140.

As shown in FIG. 8, process 800 may include maintaining an IoT device DB that stores a device status for each IoT device and an application server list for each IoT device that identifies application servers that are to be notified when the IoT device is in an awake state (block 810). For example, DSTS 140 may maintain IoT device DB 420 and may update IoT device DB 420 based on registration requests from application servers 130 and/or based on messages from application servers 130 indicating that particular IoT devices 110 are awake. Furthermore, in some implementations, registration manager 410 may also be configured to receive device status information for IoT devices 110 from particular network components, such as an MME, HSS, SCEF, and/or other devices in a core network.

An indication may be received from an application server that an IoT device is in an awake state (block 820) and an instruction may be sent to the application server to keep the IoT device in the awake state (block 830). For example, DSTS 140 may receive a message from application server 130 that IoT device 110 is in an awake state and may instruct application server 130 to instruct IoT device 110 to stay in an awake mode. The instruction to IoT device 110 to remain in the awake mode may instruct IoT device 110 to remain awake for a particular time period, until receiving a message from a particular application server 130, and/or based on another criterion.

The IoT device DB may be accessed to identify one or more other application servers that are to be notified that the IoT device is in an awake mode (block 840) and an indication may be sent to each of the other application servers that the IoT device is in an awake mode (block 850). For example, DSTS 140 may send a message to each of the identified other application servers 130 that IoT device 110 is awake. The other application servers 130 may then communicate with IoT device 110 to send any held messages to IoT device 110.

Figure 9:
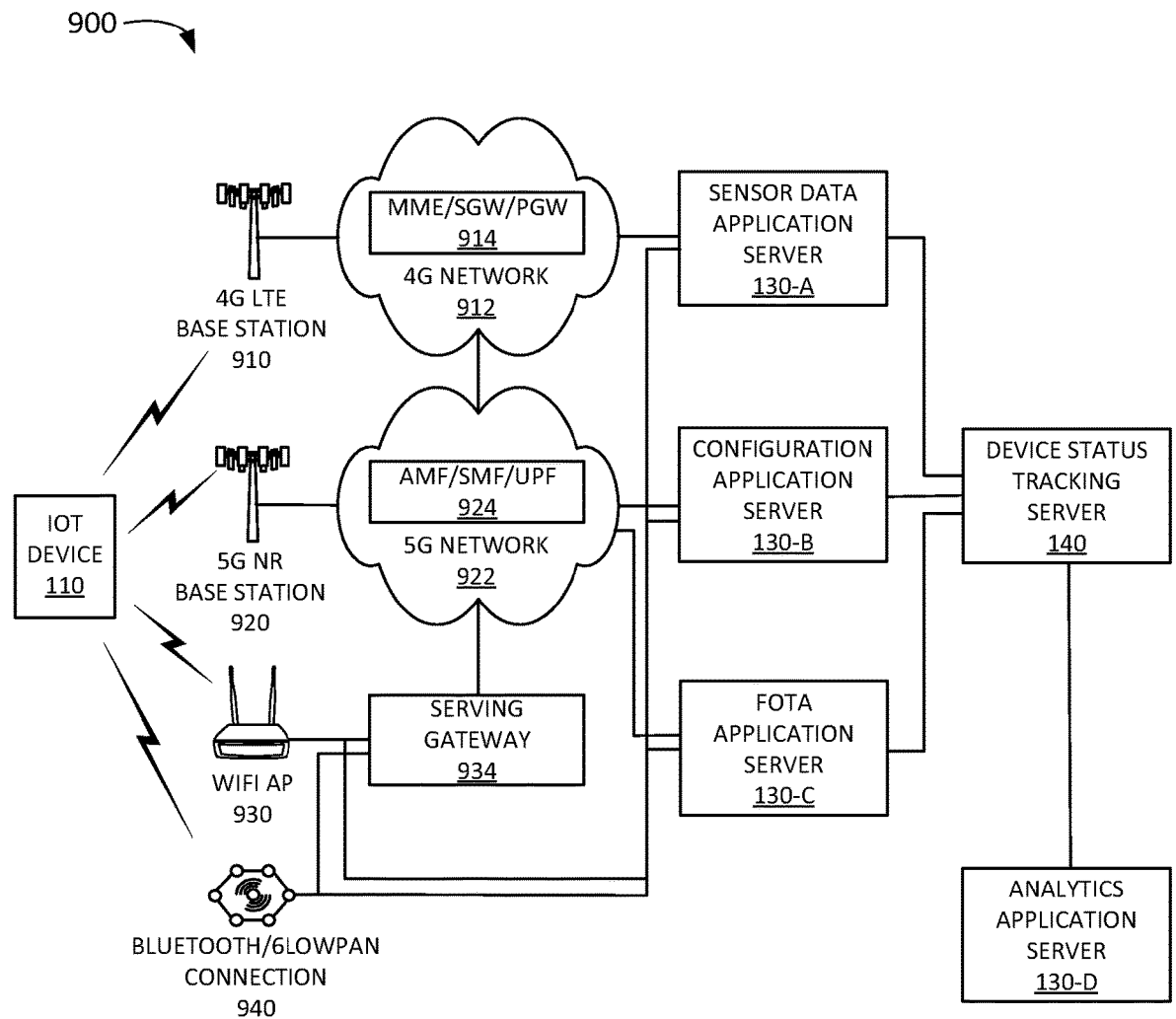
FIG. 9 illustrates an exemplary system according to an implementation described herein.

FIG. 9 illustrates an exemplary system 900 according to an implementation described herein. As shown in FIG. 9, IoT device 110 may connect to application servers 130 using different wireless communication methods. As an example, IoT device 110 may connect to 4G LTE base station 910 and 4G network 912 (which may include network devices 914 such as an MME, an SGW, and/or a PGW). As another example, IoT device 110 may connect to 5G NR base station 920 and 5G network 922 (which may include network devices 924 such as an AMF, an SMF, and/or UPF). As yet another example, IoT device 110 may connect to WiFi AP 930 and a serving gateway 934 that connects to 5G network 922 and/or 4G network 912. As yet another example, IoT device may connect to 5G network 922 and/or 4G network 912 via a Bluetooth or 6LoWPAN connection 940. FIG. 9 illustrates the possible connections from IoT device 110 to application servers 130 to demonstrate that the device status service provided by DSTS 140 is agnostic with respect to the particular connection method used by IoT device 110 to communicate with application servers 130.

IoT device 110 may be associated with a sensor data application server 130-A that receives sensor data from IoT device 110, a configuration application server 130-B that updates a configuration for a sensor associated with IoT device 110, and a FOTA application server 130-C that sends FOTA updates to IoT device 110. Sensor data application server 130-A, configuration application server 130-B, and FOTA application server 130-C may each register with DSTS 140 for device status information associated with IoT device 110. Furthermore, DSTS 140 may be configured to send aggregated device status information to analytics application server 130-D.

Figure 10:
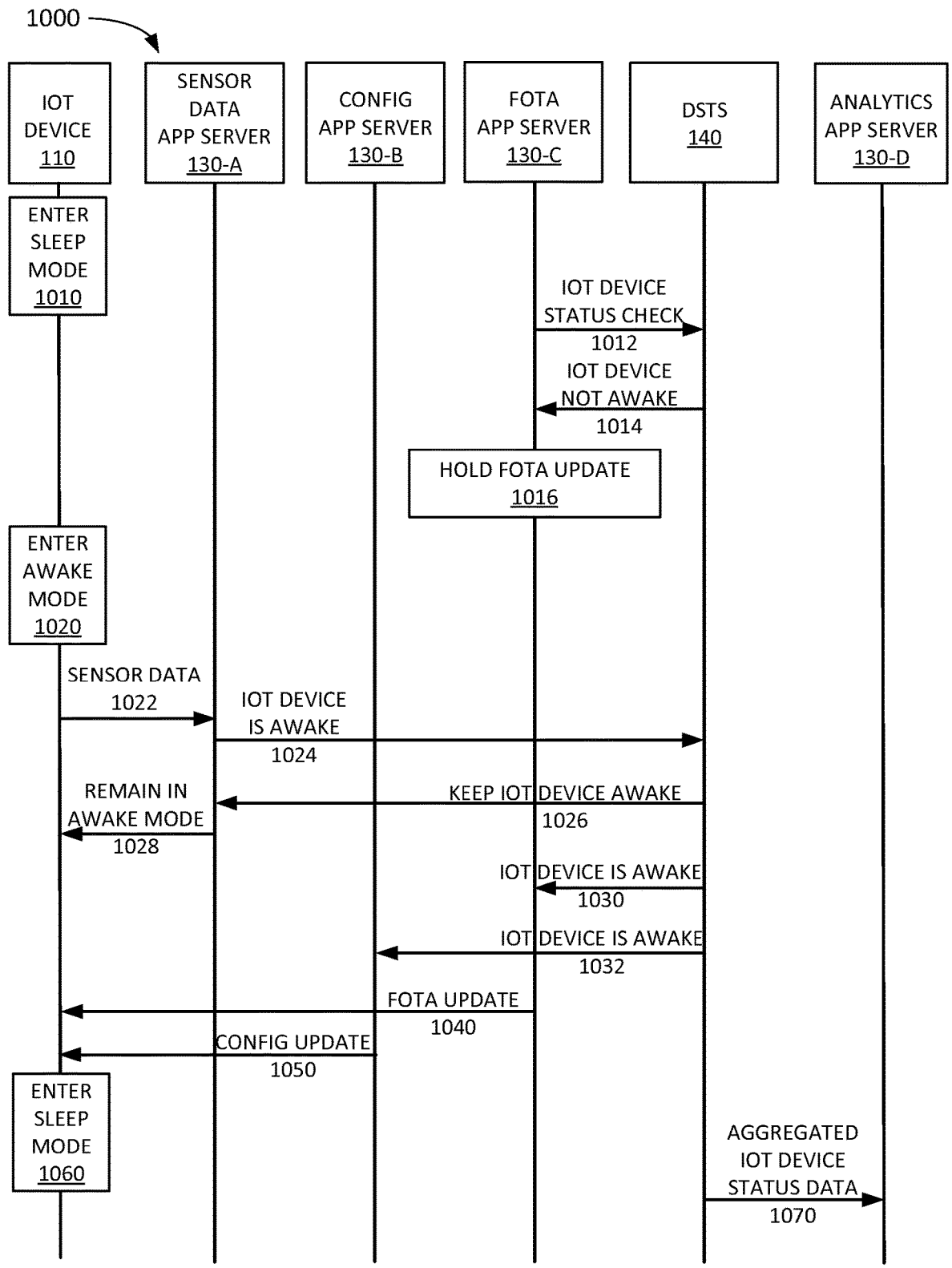
FIG. 10 illustrates an exemplary signal flow according to an implementation described herein.

FIG. 10 illustrates an exemplary signal flow 1000 according to an implementation described herein. As shown in FIG. 10, signal flow 1000 may include IoT device 110 entering sleep mode (block 1010). At a later time, FOTA application server 130-C may determine that a FOTA update is to be sent to IoT device 110 and may, in response, send an inquiry to DSTS 140 to determine the status of IoT device 110 (signal 1012). DSTS 140 may respond to FOTA application server 130-C with a message indicating that IoT device 110 is not awake (signal 1014) and, in response, FOTA application server 130-C may hold the FOTA update until IoT device 110 wakes up (block 1016).

At a later time, IoT device 110 may enter an awake mode (block 1020) and may upload sensor data to sensor data application server 130-A (signal 1022). In response, sensor data application server 130-A may send a message to DSTS 140 indicating that IoT device 110 is awake (signal 1024). DSTS 140 may respond with an instruction to sensor data application server 130-A to keep IoT device 110 awake (signal 1026) and sensor data application server 130-A may send an instruction to IoT device 110 to remain in the awake mode (signal 1028). DSTS 140 may then send messages to configuration application server 130-B and FOTA application server 130-C that IoT device 110 is awake (signals 1030 and 1032).

In response, FOTA application server 130-C may send a FOTA update to IoT device 110 (signal 1040). Furthermore, if configuration server 130-B has a configuration update for IoT device 110, configuration server 130-B may send the configuration update to IoT device 110 (signal 1050). After IoT device 110 finishes communicating with configuration server 130-B and FOTA server 130-C, IoT device 110 may return to the sleep mode (block 1060). Additionally, DSTS 140 may send aggregated device status data to analytics application server 130-D (signal 1070).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 6, 7, and 8, and a series of signals with respect to FIG. 10, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   maintaining, by a computer device, an Internet of Things (IoT) device database that stores, for an IoT device, an application server device list that identifies a plurality of application server devices that are to be notified when the IoT device changes from a sleep state to an awake state;
   receiving, by the computer device, a first indication from a first application server device that the IoT device has entered an awake state;
   sending, by the computer device and without receiving input from a user, an instruction to the first application server device to instruct the IoT device to remain in the awake state, in response to receiving the first indication from the first application server device that the IoT device is in the awake state;
   accessing, by the computer device, the IoT device database to identify a second application server device associated with the IoT device, wherein the second application server device is different from the first application server device; and
   sending, by the computer device, a second indication to the second application server device that the IoT device is in the awake state based on the received first indication from the first application server device.

2. The method of claim 1, further comprising:
   establishing a communication channel with the second application server device;
   receiving, from the second application server device, a registration request for the IoT device, wherein the registration request indicates that the second application server device is to be notified when the IoT device enters an awake state; and
   updating the application server device list for the IoT device in the IoT device database based on the received registration request.

3. The method of claim 2, further comprising:
   sending an instruction to the second application server device to send a message to the computer device when the second application server device receives a message from the IoT device indicating that the IoT device has entered the awake state; and
   monitoring the established communication channel for messages relating to the IoT device.

4. The method of claim 1, wherein the instruction to the first application server device includes an instruction to instruct the IoT device to remain awake for a particular time period.

5. The method of claim 1, wherein the instruction to the first application server device includes an instruction to instruct the IoT device to remain awake until a message is received from the second application server device.

6. The method of claim 1, further comprising:
   receiving, from a third application server device, a registration request, wherein the registration request indicates that the third application server device is to receive updates relating to particular IoT devices; and
   updating the IoT device database based on the received registration request.

7. The method of claim 6, further comprising:
   sending an update to the third application server device, wherein the update includes information indicating that the IoT device is in the awake state, based on the received first indication from the first application server device.

8. The method of claim 1, further comprising:
   receiving a request from a third application server device inquiring as to whether the IoT device is in the awake state; and
   sending a message to the third application server device indicating whether the IoT device is in the awake state, in response to receiving the request from the third application server device.

9. The method of claim 1, wherein the second application server device includes a Firmware-Over-The-Air (FOTA) device.

10. A device comprising:
    a memory storing instructions; and
    a processor configured to execute the instructions to:
       maintain an Internet of Things (IoT) device database that stores, for an IoT device in the IoT device database, an application server device list that identifies a plurality of application server devices that are to be notified when the IoT device is determined to be in an awake state;
       receive a first indication from a first application server device that the IoT device is in an awake state;
       send, without receiving input from a user, an instruction to the first application server device to instruct the IoT device to remain in the awake state, in response to receiving the first indication from the first application server device that the IoT device is in the awake state;
       access the IoT device database to identify a second application server device associated with the IoT device, wherein the second application server device is different from the first application server device; and send a second indication to the second application server device that the IoT device is in the awake state based on the received first indication from the first application server device.

11. The device of claim 10, wherein the processor is further configured to:
   establish a communication channel with the second application server device;
   receive, from the second application server device, a registration request for the IoT device, wherein the registration request indicates that the second application server device is to be notified when the IoT device enters an awake state; and
   update the application server device list for the IoT device in the IoT device database based on the received registration request.

12. The device of claim 11, wherein the processor is further configured to:
   send an instruction to the second application server device to send a message to the computer device when the second application server device receives a message from the IoT device indicating that the IoT device has entered the awake state; and
   monitor the established communication channel for messages relating to the IoT device.

13. The device of claim 10, wherein the instruction to the first application server device includes an instruction to instruct the IoT device to remain awake for a particular time period.

14. The device of claim 10, wherein the instruction to the first application server device includes an instruction to instruct the IoT device to remain awake until receiving a message from the second application server device.

15. The device of claim 10, wherein the processor is further configured to:
   receive, from a third application server device, a registration request, wherein the registration request indicates that the third application server device is to receive updates relating to particular IoT devices;
   update the IoT device database based on the received registration request; and
   send an update to the third application server device, wherein the update includes information indicating that the IoT device is in the awake state, based on the received first indication from the first application server device.

16. The device of claim 10, wherein the processor is further configured to:
   receive a request from a third application server device inquiring as to whether the IoT device is in the awake state; and
   send a message to the third application server device indicating whether the IoT device is in the awake state, in response to receiving the request from the third application server device.

17. The device of claim 10, wherein the second application server device includes a Firmware-Over-The-Air (FOTA) device.

18. A non-transitory computer-readable memory device storing instructions executable by a processor, the non-transitory computer-readable memory device comprising:
   one or more instructions to maintain an Internet of Things (IoT) device database that stores, for an IoT device in the IoT device database, an application server device list that identifies a plurality of application server devices that are to be notified when the IoT device is determined to be in an awake state;
   one or more instructions to receive a first indication from a first application server device that the IoT device is in an awake state;
   one or more instructions to send, without receiving input from a user, an instruction to the first application server device to instruct the IoT device to remain in the awake state, in response to receiving the first indication from the first application server device that the IoT device is in the awake state;
   one or more instructions to access the IoT device database to identify a second application server device associated with the IoT device, wherein the second application server device is different from the first application server device; and
   one or more instructions to send a second indication to the second application server device that the IoT device is in the awake state based on the received first indication from the first application server device.

19. The non-transitory computer-readable memory device of claim 18, wherein the instruction to the first application server device includes an instruction to instruct the IoT device to remain awake for a particular time period.

20. The non-transitory computer-readable memory device of claim 18, wherein the instruction to the first application server device includes an instruction to instruct the IoT device to remain awake until receiving a message from the second application server device.

* * * * *